United States Patent
Gray et al.

(10) Patent No.: US 8,425,871 B2
(45) Date of Patent: Apr. 23, 2013

(54) SINGLE PHASE YTTRIUM PHOSPHATE HAVING THE XENOTIME CRYSTAL STRUCTURE AND METHOD FOR ITS SYNTHESIS

(75) Inventors: Sandra Lee Gray, Horseheads, NY (US); Richard Donald Witham, Henderson, NV (US)

(73) Assignee: Corning Incorporated, Corning, NY (US)

( * ) Notice: Subject to any disclaimer, the term of this patent is extended or adjusted under 35 U.S.C. 154(b) by 594 days.

(21) Appl. No.: 12/303,658

(22) PCT Filed: Jun. 1, 2007

(86) PCT No.: PCT/US2007/012915
§ 371 (c)(1),
(2), (4) Date: Jun. 10, 2009

(87) PCT Pub. No.: WO2007/145847
PCT Pub. Date: Dec. 21, 2007

(65) Prior Publication Data
US 2009/0298672 A1    Dec. 3, 2009

Related U.S. Application Data

(60) Provisional application No. 60/811,222, filed on Jun. 5, 2006.

(51) Int. Cl.
*C01F 17/00* (2006.01)
(52) U.S. Cl.
USPC .................................. 423/263; 423/21.1
(58) Field of Classification Search .................. 501/152; 423/21.1, 21.5, 263, 311; 252/301.4 P
See application file for complete search history.

(56) References Cited

U.S. PATENT DOCUMENTS

| | | | |
|---|---|---|---|
| 4,033,790 A | 7/1977 | Gunjigake et al. | 148/22 |
| 4,037,110 A * | 7/1977 | Shaffer et al. | 250/483.1 |
| 4,486,397 A * | 12/1984 | Eshraghi et al. | 423/306 |
| 5,350,460 A | 9/1994 | Pickrell et al. | 148/33 |
| 5,951,958 A * | 9/1999 | Kimura | 423/263 |
| 6,974,786 B2 | 12/2005 | Helfinstine et al. | 501/106 |
| 7,001,679 B2 | 2/2006 | Campbell et al. | 428/698 |
| 2002/0189496 A1 | 12/2002 | Davis et al. | 106/287.18 |
| 2003/0032192 A1* | 2/2003 | Haubold et al. | 436/56 |
| 2003/0035907 A1 | 2/2003 | Campbell et al. | 428/26 |
| 2003/0121287 A1 | 7/2003 | Chalk et al. | 65/90 |
| 2004/0020568 A1 | 2/2004 | Phelps et al. | 148/273 |
| 2004/0055338 A1 | 3/2004 | Helfinstine et al. | 65/374.13 |

OTHER PUBLICATIONS

Lucas, S. et al., Rare EarthPhosphate Powders RePO4 -nH2O (Re = La, Ce or Y) II. Thermal Behavior, 2004, Journal of Solid State Chemistry, 177, pp. 1312-1320.*
Nedelec, J.M. et al., Soft Chemistry Routes to YPO4-Based Phosphors: Dependence of Textural and Optical Properties on Synthesis Pathways, 2002, Chem. Mater., 14, pp. 651-655.*
Ball, R.G.J. et al., *The Calculation of Phase Equilibria of Oxide Core-Concrete Systems*, vol. 201 (1993), pp. 238-249.
Kingery W.D., et al. , *Introduction to Ceramics*, Second Edition (1960), pp. 739-747.
Szuszkiewicz, W., *Phase Equilibria in the System Y2O3 —P2O5* vol. 381 (1989) pp. 381-391.

* cited by examiner

*Primary Examiner* — Steven Bos
(74) *Attorney, Agent, or Firm* — Steven Chen; Thomas R. Beall; Stephen S. Wentsler

(57) ABSTRACT

Methods for producing substantially single phase yttrium phosphate which exhibits the xenotime crystal structure are disclosed. The methods can be practiced without the use of high temperatures (e.g., the methods can be practiced at temperatures less than 1000° C.). The resulting yttrium phosphate can be in the form of particles which comprise interwoven strands of crystals of yttrium phosphate and/or nanoparticles prepared from such particles.

16 Claims, 2 Drawing Sheets

SINGLE PHASE YTTRIUM PHOSPHATE HAVING THE XENOTIME CRYSTAL STRUCTURE AND METHOD FOR ITS SYNTHESIS

CROSS REFERENCE TO RELATED APPLICATION

This application claims the benefit under 35 USC §119(e) of U.S. Provisional Application No. 60/811,222 filed Jun. 5, 2006, the contents of which in its entirety is hereby incorporated by reference.

BACKGROUND OF INVENTION

This invention relates generally to yttrium phosphate and a method for producing it in commercial quantities, and is particularly concerned with a pure or single phase yttrium phosphate having the xenotime crystal structure and a process for synthesizing it without utilizing extremely high temperatures.

In recent years many researchers have explored the use of yttrium phosphate in the field of ceramic materials. Yttrium phosphate appears to be valuable for use in laminate composites, as a fiber-matrix interface in ceramic matrix composites and as coatings for thermal protection. It appears to be particularly useful as a coating because of its resistance to expansion when exposed to high temperatures.

Although the synthesis of yttrium phosphate by various researchers has been reported, either via expensive high-temperature solid state reactions and wet chemical precipitation, large quantities of yttrium phosphate for commercial applications do not appear to be available. Furthermore, it is very important in the field of ceramic materials processing that any yttrium phosphate utilized be free of secondary phases and other impurities. Thus, there is a distinct need for the development of relatively inexpensive methods to synthesize large quantities of pure or single phase yttrium phosphate, especially yttrium phosphate having the xenotime crystal structure.

SUMMARY OF THE INVENTION

In accordance with the invention, it has now been found that pure phase yttrium phosphate with the xenotime crystal structure can be synthesized using a relatively low temperature process that begins by forming a slurry of a solid and relatively insoluble yttrium compound, preferably yttrium oxide, in water. Phosphoric acid is then added to the slurry in an amount less than the stoichiometric amount required to form yttrium phosphate. Thus, the mole ratio of yttrium to phosphorus in the slurry is greater than 1.0. An inorganic acid, preferably nitric acid, is then added to the slurry to react with the excess yttrium compound and thereby form a water-soluble yttrium salt. The solid yttrium phosphate formed by the reaction of the yttrium compound with the phosphoric acid, which is substantially free of any excess phosphoric acid and yttrium compound, is then removed from the slurry, washed to remove soluble impurities and dried, usually at temperatures well below 1000° C. The resultant material is a single or pure phase yttrium phosphate having the xenotime crystal structure that is free of unreacted yttrium compound and phosphoric acid and contains no other forms of yttrium phosphate. The fact that this pure phase yttrium phosphate can be made without the need to utilize temperatures above 1000° C. means that the use of the process of the invention results in substantial cost savings.

BRIEF DESCRIPTION OF THE DRAWINGS

FIG. 1 is an XRD pattern of a sample obtained from an in-progress test after phosphoric acid addition, then filtered, washed and dried at 1,000° C., while FIG. 2 shows the transformation to single phase yttrium phosphate after reaction with mineral acid, washing and drying to 1,000° C.

DETAILED DESCRIPTION OF THE INVENTION

Figure 1:
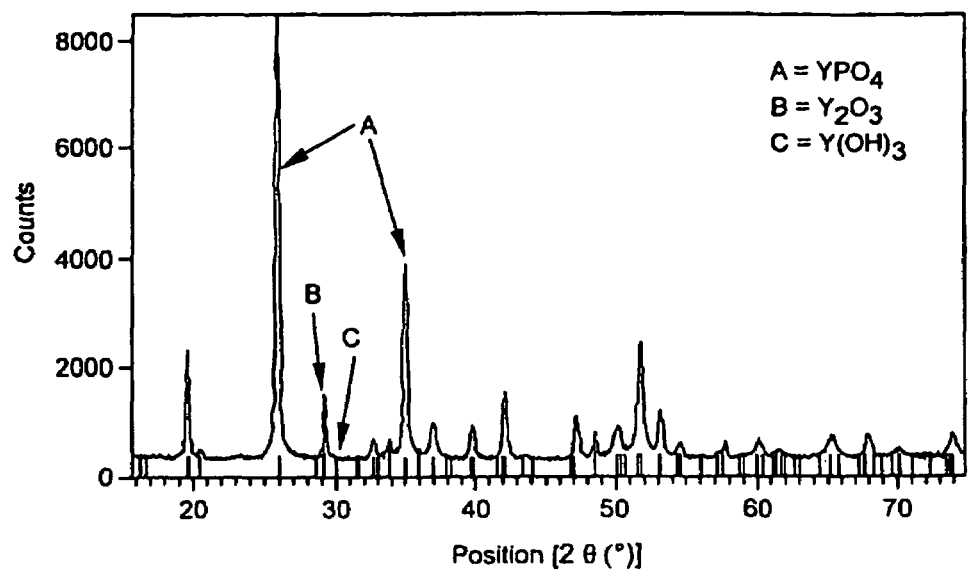
FIGS. 1 and 2 are XRD patterns. In particular.

The first step in the process of the invention for producing commercial amounts of yttrium phosphate is the formation of a slurry containing a yttrium compound. Any solid yttrium compound that is relatively insoluble in water can be used. Typically, the yttrium compound will have a solubility less than about 0.1 grams/liter. Examples of yttrium compounds that can be used include yttrium oxide, yttrium carbonate, yttrium bicarbonate and hydroxide. Generally, enough of the solid yttrium compound is mixed with water so that the resultant slurry contains between about 0.5 and 50 weight percent solids, preferably between about 3.0 and about 20 weight percent, and more preferably between about 5 and 15 weight percent.

While the aqueous slurry of the yttrium compound is vigorously agitated, phosphoric acid is added to form yttrium phosphate. It has been found that using a stoichiometric amount of phosphoric acid results in the formation of yttrium phosphate containing unreacted yttrium compound and unreacted phosphoric acid as well as non-xenotime yttrium phosphate. It is theorized that this contaminated yttrium phosphate results from an incomplete reaction due to the encapsulation of unreacted yttrium compound and the slow disassociation of phosphoric acid. It has been surprisingly found that limiting the amount of the phosphoric acid that is added to less than the stoichiometric amount needed ultimately results in the formation of a pure single phase yttrium phosphate with the xenotime mineral structure. Thus, the phosphoric acid is added to the aqueous slurry of the yttrium compound in an amount that is less than the stoichiometric amount required for the formation of yttrium phosphate.

Generally, a 75 to 85 weight percent solution of phosphoric acid is added to the slurry over a period of about 15 minutes to about 90 minutes as the slurry is continuously agitated and maintained at a temperature that typically ranges between about 20° C. and about 70° C. The amount of the phosphoric acid added to the slurry is usually about 1.5 molar percent less than the amount of the yttrium compound present in the slurry. When the yttrium compound used is yttrium oxide, the reaction takes place to form yttrium phosphate, minor amounts of yttrium oxide, minor amounts of surface adsorbed phosphoric acid and water. The yttrium phosphate formed comprises approximately 95.5 percent of the solids portion in the slurry.

In order to remove the excess yttrium oxide and phosphoric acid from the solids in the slurry, a small amount of an inorganic acid is added to the slurry. The acid releases the yttrium compound and phosphoric acid from the yttrium phosphate and allows them to react on their own until the phosphoric acid is consumed. The 1.5 molar percent excess of the yttrium compound reacts with the acid to form a soluble yttrium salt which dissolves in the aqueous phase of the slurry. When yttrium oxide is used as the yttrium compound and nitric acid is used as the inorganic acid, the reaction provides soluble yttrium nitrate which combines with the remaining phosphoric acid to produce yttrium phosphate solids and with minor amounts of yttrium nitrate in solution.

The yttrium phosphate, which at this point in the process has the crystal structure of the mineral churchite (hydrated yttrium phosphate), is then separated from the aqueous phase by filtration, centrifugation or other liquid-solids separation technique.

Although nitric acid is used for purposes of illustration, many other inorganic acids can normally be utilized to solubilize the excess yttrium compound to remove it from the precipitated yttrium phosphate. Examples of such acids include hydrobromic acid, hydroiodic acid, and sulfuric acid.

Once the yttrium phosphate is removed from the aqueous phase of the slurry, it is normally washed with water to remove any residual soluble impurities and then dried at temperatures below 1000° C. It has been found that the yttrium phosphate removed from the aqueous slurry is ultra high purity, single phase needle crystals of the mineral churchite and is essentially free of unreacted constituents and non-churchite yttrium phosphate. The drying step is only needed to drive off moisture converting the yttrium phosphate from the churchite to the xenotime crystal structure and not to decompose unreacted yttrium compound, phosphoric acid, or other impurities. The conversion from churchite to xenotime crystal structure occurs at approximately 300° C. In view of this, substantial cost savings can be obtained by drying the yttrium phosphate at relatively low temperatures between about 300° C. and 900° C., preferably at a temperature below 500° C.

The yttrium phosphate recovered from the drying step is substantially pure single phase yttrium phosphate of the xenotime crystal structure. The molecular formula is $Y_aPO_4$ where a ranges from 1.000 to 1.005. Preferably, the amount of yttrium present does not exceed 0.25 mole percent excess Y based on the formula $YPO_4$. The particles of the yttrium phosphate formed are needle-like and appear in the form of soft clumps of interwoven strands of fine crystals. The clumps can be easily spread apart to form nanosize particles.

The nature and objects of the invention are further illustrated by the following examples, which are provided for illustrative purposes only and not to limit the invention as defined by the claims. The examples show the effect of using mineral acid to dissolve excess yttrium oxide and form pure phase-yttrium phosphate.

FIG. 1, i.e., XRD pattern of sample DW-15-127-1, illustrates the solid material, predominantly yttrium phosphate, with minor amounts of yttrium oxide present. The sample was obtained from an in-progress test after phosphoric acid addition, then filtered, washed and dried at 1,000° C.

Figure 2:
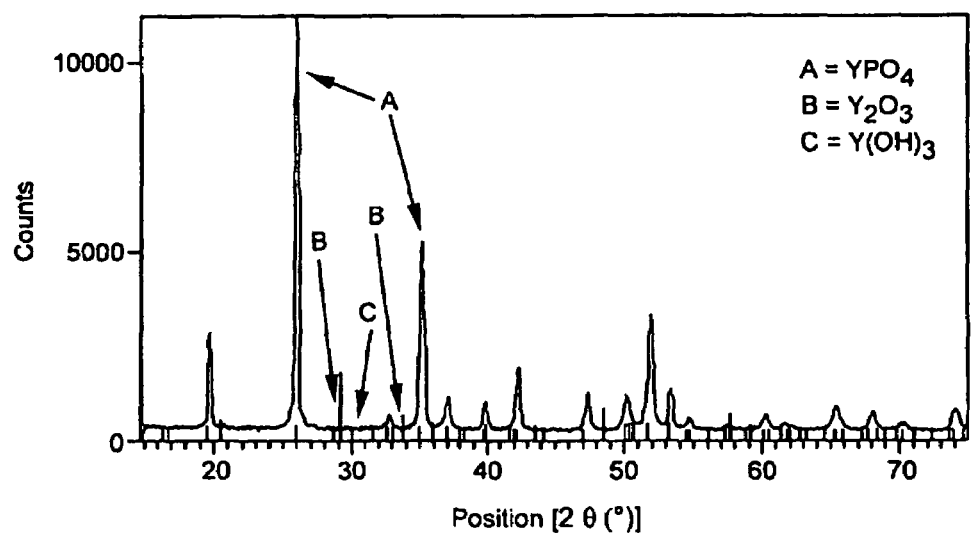

FIG. 2, i.e., XRD pattern DW-15-127-3, shows the transformation from material as shown in DW-15-1276-1 to single phase yttrium phosphate after reaction with mineral acid, washing and drying to 1,000° C.

Figure 3:
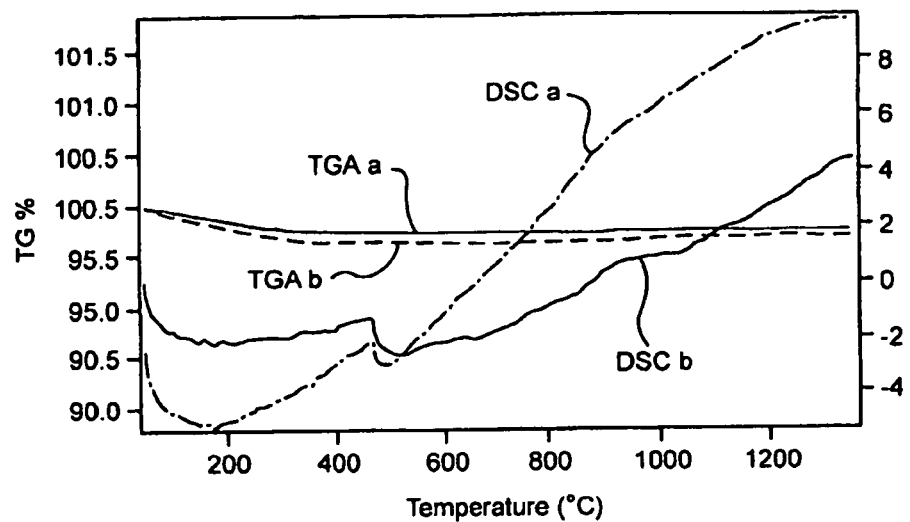
FIGS. 3 and 4 are images of Thermogravametric (TGA) and Differential Scanning Calorimetry tests performed on the same samples as FIGS. 1 and 2.
Figure 4:
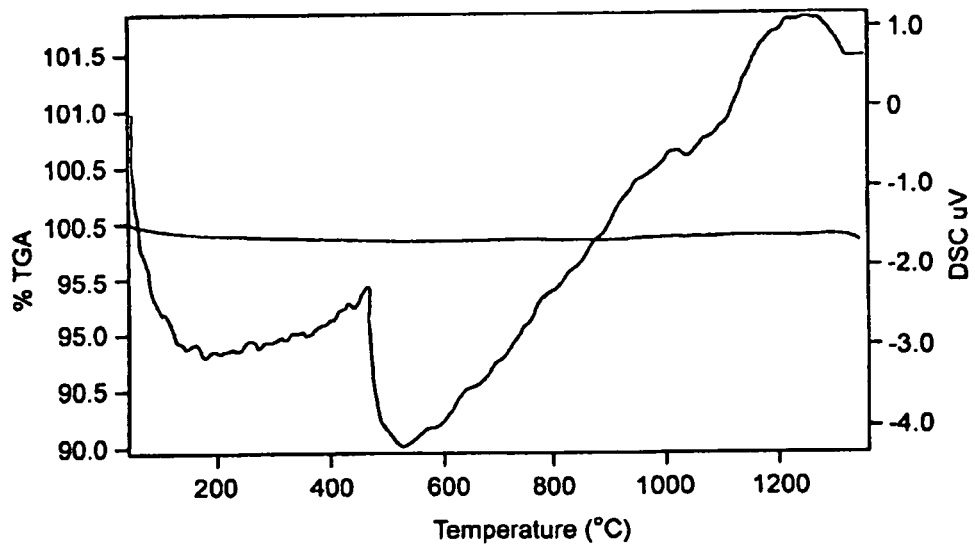

FIGS. 3 and 4 are images of Thermogravametric (TGA) and Differential Scanning Calorimetry tests performed on the same samples as FIGS. 1 and 2. FIGS. 3 and 4 confirm phase purity due to the absence of further phase transformations.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of synthesizing yttrium phosphate compounds comprising:
    (a) producing the yttrium phosphate compounds by a process consisting of the steps of:
        (i) forming an aqueous slurry of a relatively insoluble yttrium compound;
        (ii) adding phosphoric acid to the slurry to form the yttrium phosphate compounds, the amount of phosphoric acid added being less than the stoichiometric amount needed to convert all of the yttrium compound to the yttrium phosphate compounds, wherein the slurry is maintained at a temperature between about 20° C. and about 70° C.; and
        (iii) adding an inorganic acid to the slurry which forms a water soluble salt with yttrium; and
    (b) isolating the yttrium phosphate compounds by separating the slurry into solid yttrium phosphate compounds and an aqueous phase.

2. The method of claim 1 further comprising drying or washing and drying the solid yttrium phosphate compounds of (b).

3. The method of claim 2 wherein the drying is at a temperature above 300° C. and less than 1,000° C.

4. The method of claim 3 wherein the drying is at a temperature below 500° C.

5. The method of claim 2 wherein the dried or washed and dried yttrium phosphate compounds exhibit a xenotime crystal structure.

6. The method of claim 2 wherein the dried or washed and dried yttrium phosphate compounds are substantially single phase yttrium phosphate compounds.

7. The method of claim 2 wherein the dried or washed and dried yttrium phosphate compounds satisfy the formula:

$$Y_aPO_4$$

where a ranges from 1.000 to 1.005.

8. The method of claim 2 wherein the dried or washed and dried yttrium phosphate compounds satisfy the formula:

$$Y_aPO_4$$

where a ranges from 1.000 to 1.0025.

9. The method of claim 2 wherein the dried or washed and dried yttrium phosphate compounds are in the form of particles.

10. The method of claim 9 wherein the particles comprise interwoven strands of crystals of yttrium phosphate compounds.

11. The method of claim 10 further comprising forming nanosize particles from the interwoven strands of the crystals of yttrium phosphate compounds.

12. The method of claim 1 wherein in (i) the yttrium compound has a solubility less than about 0.1 grams/liter.

13. The method of claim 1 wherein in (i) the yttrium compound is yttrium oxide.

14. The method of claim 1 wherein the amount of phosphoric acid added in (ii) is about 1.5 molar percent less than the amount of the yttrium compound present in the slurry.

15. The method of claim 1 wherein in (iii) the inorganic acid is nitric acid.

16. The method of claim 1 wherein in (b) the solid yttrium phosphate compounds exhibit a churchite crystal structure.

* * * * *